United States Patent
Roberts et al.

(10) Patent No.: US 7,903,681 B2
(45) Date of Patent: Mar. 8, 2011

(54) METHOD FOR DISTRIBUTING A COMMON TIME REFERENCE WITHIN A DISTRIBUTED ARCHITECTURE

(75) Inventors: Peter Roberts, Stittsville (CA); Truc Le, Stittsville (CA)

(73) Assignee: Alcatel Lucent, Paris (FR)

( * ) Notice: Subject to any disclaimer, the term of this patent is extended or adjusted under 35 U.S.C. 154(b) by 260 days.

(21) Appl. No.: 12/139,026

(22) Filed: Jun. 13, 2008

(65) Prior Publication Data

US 2009/0310625 A1    Dec. 17, 2009

(51) Int. Cl.
    H04L 12/40    (2006.01)
(52) U.S. Cl. .......... 370/438; 370/431; 709/248; 375/354
(58) Field of Classification Search ............... 370/464, 370/468, 503–520; 375/354–376; 709/248; 701/1–302
    See application file for complete search history.

(56) References Cited

U.S. PATENT DOCUMENTS

| | | | | |
|---|---|---|---|---|
| 6,854,019 | B2* | 2/2005 | Egle | 709/248 |
| 2002/0143998 | A1* | 10/2002 | Rajagopal et al. | 709/248 |
| 2003/0103486 | A1* | 6/2003 | Salt et al. | 370/350 |
| 2005/0193095 | A1* | 9/2005 | Driediger et al. | 709/219 |
| 2006/0133426 | A1* | 6/2006 | Craddock et al. | 370/503 |
| 2006/0244501 | A1 | 11/2006 | Foerster et al. | |
| 2010/0161723 | A1* | 6/2010 | Bryce et al. | 709/203 |

FOREIGN PATENT DOCUMENTS

WO    0159965 A1    8/2001

* cited by examiner

Primary Examiner — William Trost, IV
Assistant Examiner — Charles C Jiang
(74) Attorney, Agent, or Firm — Kramer & Amado, P.C.

(57) ABSTRACT

A method of distributing a common time reference within a distributed architecture includes one or more of the following: generating at least one electrical pulse at a central entity; distributing the at least one electrical pulse to a subassembly; receiving the at least one electrical pulse at the subassembly; recording a reception counter value corresponding to a value of a local frequency counter when the at least one electrical pulse is received at the subassembly; querying the central entity to obtain a generation time value corresponding to a time at which the at least one electrical pulse was generated; and determining a global time value using the generation time value, the reception counter value, and a current counter value of the local frequency counter.

20 Claims, 6 Drawing Sheets

METHOD FOR DISTRIBUTING A COMMON TIME REFERENCE WITHIN A DISTRIBUTED ARCHITECTURE

BACKGROUND OF THE INVENTION

1. Field of the Invention

This invention relates generally to the use of reference clocks within distributed architectures.

2. Description of Related Art

An example of a distributed architecture includes a telecommunications (telecom) switch with a central clock for frequency distribution. Such devices and systems are used, for example, to synchronize a network to ensure that data is transmitted at a synchronized rate. In evolving applications, such devices and systems need to synchronize a network to the time of day. In such applications, there is often a need to synchronize the network to the time of day in a highly accurate manner.

Synchronous optical networking (SONET) refers to intelligent systems that provide advanced network management and a standard optical interface. Specified in the Broadband ISDN (B-ISDN) standard, SONET backbones are widely used to aggregate T1 and T3 lines. Thus, SONET is a physical layer network technology designed to carry large volumes of traffic over relatively long distances on fiber optic cabling. Accordingly, SONET is used to synchronize a frequency throughout a network as described above.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

SUMMARY OF THE INVENTION

In light of the present need for a method for distributing a common time reference within a distributed architecture, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments achieve a highly accurate time of day synchronization to distributed processing modules, such as line cards, within a networking element. This capability is beneficial when it is desired to generate timestamps on separate modules that use the same time base. For example, such a capability is sometimes used to time packet transits from an ingress interface module to an egress interface module. Similarly, various exemplary embodiments are used to support network-wide time protocols such as IEEE1588v2. The IEEE 1588v2 time of day synchronization is used in various products to achieve synchronization of network nodes.

SONET has well defined clock frequency distribution for accurate frequency synchronization or syntonization of network nodes. However, Ethernet interfaces are replacing SONET interfaces in network nodes. Thus, there is a growing need for a different approach to synchronization.

Packet based methods for delivering both time of day synchronization and syntonization are implemented in current embodiments. For example, Network Timing Protocol (NTP) is used to timestamp Ethernet packets for time of day synchronization. However, NTP generated timestamps at Layer-3 often introduce inaccuracies. This is due to the variation in delay the packets experience between the timestamp generation and the actual packet transmission.

Fully standards compliant implementations of NTP are also restricted to a maximum packet rate of 0.5 Hz. This restriction increases initial acquisition time and also reduces the overall accuracy. NTP has been able to deliver accuracies in the 10 ms range but it is desirable to achieve an accuracy of 1 microsecond.

IEEE 1588v2 is often preferable to NTP because it is more accurate. This is true because IEEE 1588v2 supports a higher packet rate and functions at Layer-1. This enables IEEE 1588v2 to timestamp Ethernet packets at physical receive and transmit interfaces, resulting in the superior accuracy.

Unfortunately, network delay varies in large networks. This variability presents a problem to IEEE 1588v2 time of day accuracy. Various embodiments address this problem using transparent clocks and boundary clocks. This will be described in greater detail below in connection with FIG. 1 and FIG. 2.

In the past, a highly accurate distribution of a common time base has not typically been implemented in telecom systems. When subassemblies, such as line cards, of such systems have desired a time value, that time value has typically been distributed through the messaging system at the time the subassembly powers up. Such an approach enables the time base of each subassembly to be within a couple of milliseconds of each other. However, an accuracy better than that is uncertain in such systems.

According to the foregoing, various exemplary embodiments synchronize time of day throughout a network using packet based timestamps. In such embodiments, it is desirable that the timestamps be generated as close as possible to the physical port.

In current embodiments of the architecture of telecom systems, a central clock module provides a frequency reference that is distributed over the system backplane to all subassemblies. Accordingly, various exemplary embodiments use the frequency reference for subassemblies where a common frequency is required. However, though the foregoing architecture typically ensures the distribution of a common frequency throughout a network, it does not provide time of day synchronization among the subassemblies. Thus, various exemplary embodiments synchronize the time of day among subassemblies in connection with a frequency reference that is distributed over the system backplane to all subassemblies.

Messaging based systems within the node are used to distribute a time reference as described above. However, the accuracy of such systems is adversely impacted by messaging queues and process priorities. Accordingly, messaging based systems cannot achieve desired accuracies for time of day distribution and synchronization.

In some current embodiments of distributed architectures, a real time clock module is provided in a central module. In some such embodiments, the real time clock module is accessible by the sub assemblies via a common memory address. This allows the sub assemblies to obtain the correct time value from one location when it is needed. However, this architecture is not commonly available in telecom devices.

Various exemplary embodiments overcome the foregoing deficiencies. Accordingly, various exemplary embodiments achieve a highly accurate time of day synchronization among subassemblies not present in existing telecom systems by making use of frequency references on the subassemblies.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Referring now to the drawings, in which like numerals refer to like components or steps, there are disclosed broad aspects of various exemplary embodiments.

Figure 1:
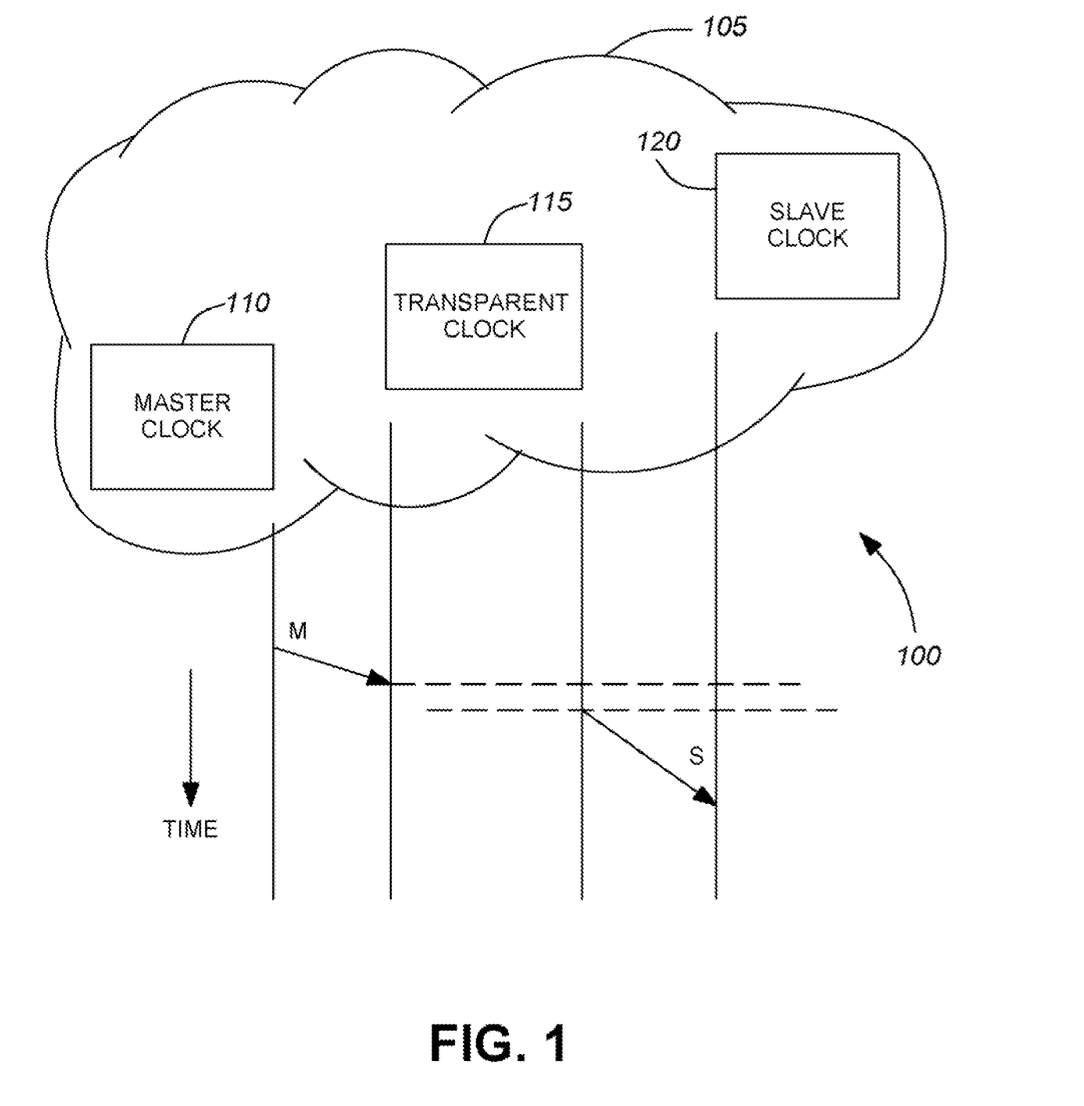
FIG. 1 is a schematic diagram depicting an exemplary embodiment of a method for distributing a common time reference within a distributed architecture including a transparent clock.

FIG. 1 is a schematic diagram 100 depicting an exemplary embodiment of a method for distributing a common time reference within a distributed architecture including a transparent clock 115. The schematic diagram 100 includes a network cloud 105. The network cloud 105 includes a master clock 110, the transparent clock 115 and a slave clock 120. This schematic diagram 100 is distinguished by the presence of the transparent clock 115, and is referred to elsewhere herein by reference to the transparent clock 115.

The master clock 110 sends a packet to the transparent clock 115 as indicated by the arrow M in schematic diagram 100. The transparent clock 115 then forwards the packet to the slave clock 120 as indicated by the arrow S in the schematic diagram 100. As indicated by the dotted lines in the schematic diagram 100, a period of time also passes between the time when the transparent clock 115 receives the packet and when the transparent clock 115 sends the packet.

Accordingly, in various exemplary embodiments with the transparent clock 115, the packet is updated with a transit time through the transparent clock 115. The transit time through the transparent clock 115 corresponds to the time that passes between the dotted lines in schematic diagram 100.

In general, the transparent clock 115 updates the IEEE1588v2 packets with the residence time of the packet between when it is received and when it is transmitted by the node. The transparent clock 115 is thus IEEE1588v2 aware and time stamps at the physical interface as the packets are received or transmitted.

Based on the foregoing, a method implemented according to schematic diagram 100 includes the following. A packet is transmitted from the master clock 110 to the transparent clock 115. The packet is received by the transparent clock 115. The packet transits through the transparent clock 115. The packet is then updated with the residence or transit time through the transparent clock 115. The packet is then transmitted from the transparent clock 115 to the slave clock 120. Finally, the packet is received by the slave clock 120.

Figure 2:
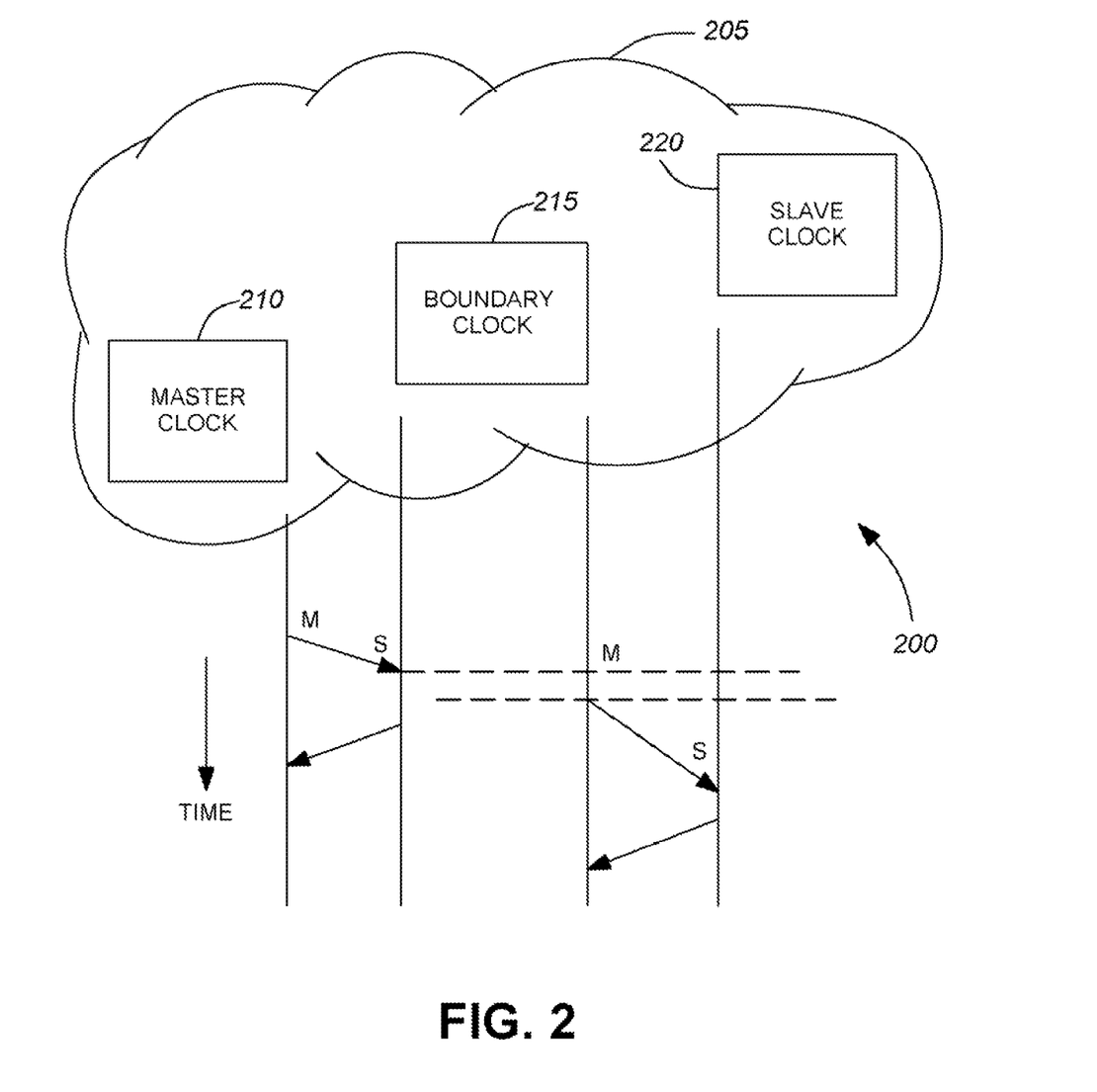
FIG. 2 is a schematic diagram depicting an exemplary embodiment of a method for distributing a common time reference within a distributed architecture including a boundary clock.

FIG. 2 is a schematic diagram 200 depicting of an exemplary embodiment of a method for distributing a common time reference within a distributed architecture including a boundary clock 215. The schematic diagram 200 includes a network cloud 205. The network cloud 205 includes a master clock 210, the boundary clock 215 and a slave clock 220. This schematic diagram 200 is distinguished by the presence of the boundary clock 215, and is referred to elsewhere herein by reference to the boundary clock 215.

The boundary clock 215 has one slave port to terminate the upstream flow to recover the time from a higher level master clock (not shown). This is indicated in schematic diagram 200 by the arrow on the time line between master clock 210 and boundary clock 215 labeled for the higher level master clock M and the slave port S of the boundary clock 215.

The boundary clock 215 then uses the recovered time to run ports of its own master clock 210 towards ports of a downstream slave clock (not shown). This is indicated in schematic diagram 200 by the arrow on the time line between boundary clock 215 and slave clock 220 labeled for the ports M of its own master clock 210 and the ports of the downstream slave clock S. As with the transparent clock 115 type, the boundary clock 215 is also IEEE1588v2 aware and also time stamps at the physical interface as the packets are received or transmitted.

Accordingly, a method implemented according to schematic diagram 200 includes the following. A packet is transmitted from an upstream master clock to the boundary clock 215. That packet is received by the boundary clock 215. The upstream flow is then terminated at a slave port of the boundary clock 215.

Next, the time at the boundary clock 215 is recovered from the upstream higher level master clock. Then, the recovered time is fed from the boundary clock 215 master port towards downstream slave clock port(s). Subsequently, the recovered time is received at the downstream slave clock port(s).

Figure 3:
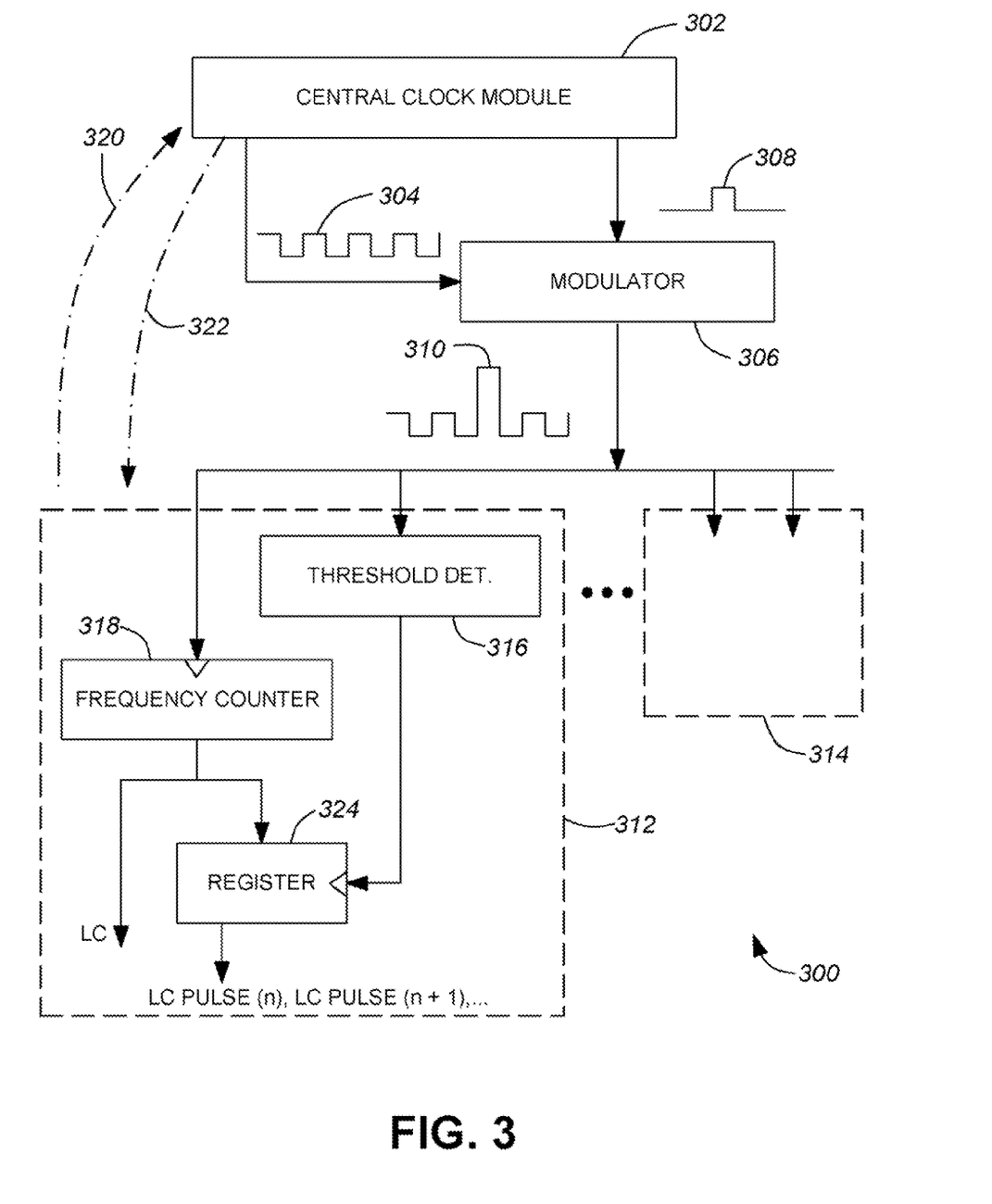
FIG. 3 is a schematic diagram of a first exemplary embodiment of a system for distributing a common time reference within a distributed architecture including an electrical clock pulse signal and a time of day pulse signal.

FIG. 3 is a schematic diagram of a first exemplary embodiment of a system 300 for distributing a common time reference within a distributed architecture including an electrical clock pulse signal 304 and a time of day pulse signal 308. It should be understood that, in various exemplary embodiments the system 300 corresponds to a network element. As depicted, exemplary system 300 includes a central clock module 302, a modulator 306, a line card 312, and a line card 314.

The line card 312 and the line card 314 represent the subassemblies discussed elsewhere herein. Accordingly, the terms line card and subassembly are used interchangeably at times herein.

Detail has been omitted from the line card 314 for simplicity. However, it should be understood that the detail of the line card 314 is intended to parallel the detail provided for the line card 312 as further discussed below. It should also be apparent that various exemplary embodiments include any number of line cards. Thus, various exemplary embodiments include any number of line cards above and beyond the line card 312 and line card 314 shown in system 300. Such additional line cards are omitted in FIG. 3 for the sake of simplicity of system 300 as depicted therein.

The line card 312 includes a threshold detector 316, a frequency counter 318, and a register 324. The functions of the threshold detector 316, the frequency counter 318, and the register 324 will be discussed in greater detail below.

In various exemplary embodiments, an electrical pulse from a central clock system is distributed to the subassemblies, either as a separate electrical signal or superimposed on an existing frequency reference signal. The generation of this pulse is used as an indication of an event in time. Various exemplary embodiments where the signals are distributed to the subassemblies separately will be discussed below in connection with FIG. 5 and FIG. 6. The embodiment depicted in system 300 corresponds to various exemplary embodiments where the signals are superimposed as follows.

The electrical clock pulse signal 304 is transmitted from the central clock module 302 to the modulator 308. Likewise, the time of day pulse signal 308 is transmitted from the central clock module 302 to the modulator 308. In various exemplary embodiments, the pulses described herein are provided from the central clock module 302 to the subassemblies 312, 314 over a unique electrical path. In various other exemplary embodiments, the pulses described herein are provided over an electrical path that is overlaid onto an existing path such as the path used for common frequency distribution.

After receiving the electrical clock pulse signal 304 and the time of day pulse signal 308, the modulator 306 superimposes the electrical clock pulse signal 304 and the time of day pulse signal 308 to create a modulated reference clock pulse signal 310. In various exemplary embodiments, the modulator 306 superimposes the electrical clock pulse signal 304 and the time of day pulse signal 308 using a summing function.

The modulator 306 transmits the modulated reference clock pulse signal 310 to each of subassembly 312 and subassembly 314. In exemplary system 300, the modulated reference clock pulse signal is received by both the threshold detector 316 and the frequency counter 318 in the line card 312.

In various exemplary embodiments, all of subassemblies 312, 314 detect the time of day pulse 308 within a very small and predictable time from when the central clock module 302 issues the time of day pulse 308. In various exemplary embodiments, the subassemblies then use a normal messaging system to query the central clock module 302. This is represented in exemplary system 300 by query 320.

In response to query 320, the central clock module sends a signal 322 containing a time value in a central time database. The time value sent in signal 322 is the value that corresponded to the time when the time of day pulse 308 was sent out by the central clock module 302. This value is represented herein by the central time variable CTpulse(n).

When a plurality of time of day pulses 308 are emitted by the central clock module 302, it is believed to be desirable that an interval between each time of day pulse 308 is large enough to ensure that the subassemblies 312, 314 are able to retrieve the time value CTpulse(n) in signal 322 before the next time of day pulse 308 is triggered. For example, in various exemplary embodiments, a one pulse per second (pps) rate is used.

In order for the subassembly 312, 314 to generate a timestamp using the modulated reference clock pulse signal 310, each subassembly 312, 314 runs the frequency counter 318 at the reference clock rate based off the same frequency used by the central clock module 302. Thus, as discussed above, in various exemplary embodiments the frequency used by the central clock module 302 is provided on a telecom device through a centrally distributed frequency.

In order to detect the time of day pulse signal 308 in the line card 312, the threshold detector 316 detects that a threshold in the amplitude of the modulated reference clock pulse signal 310 has been exceeded. It should be apparent that the threshold is greater than the amplitude of the electrical clock pulse signal 304 and less than the total of superimposed pulses from the electrical clock pulse signal 304 and time of day pulse signal 308.

When the time of day pulse 308 is detected by the line card 312, the value of the local counter LC from the frequency counter 318 is recorded in the register 324. In various exemplary embodiments, this is achieved using some form of hardware latching. The recorded value of LC from the register 324 is represented herein by the variable LCpulse(n).

Once the query response 322 is received, the subassembly 312 updates its value of CTpulse(n) to the value received from the central clock module 302 in the query response 322. The subassembly 312 then calculates a global time value of an event. The global time value is represented herein by the variable GT(x). The subassembly 312 calculates GT(x) of an event that occurred at time x by using the current counter value LC(x) as follows, where n refers to a pulse instance and x refers to an instance in time of the event in question.

$$GT(x) = CTpulse(n) + (LC(x) - LCpulse(n))/(\text{central clock frequency}).$$

In various exemplary embodiments, the subassembly 312 retains the information from the previous pulse until new information is available for both the latch local counter value and the corresponding central timestamp.

Figure 4:
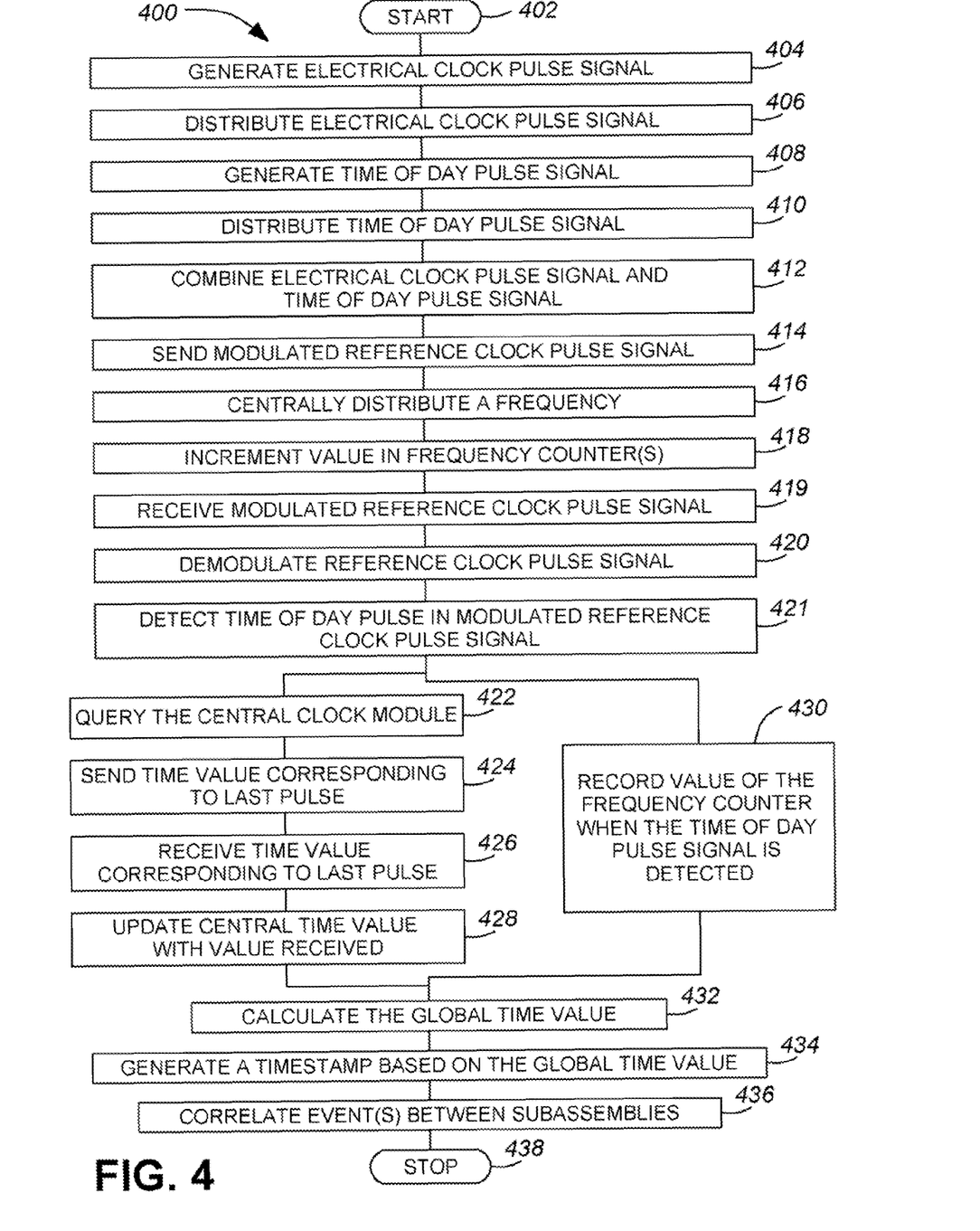
FIG. 4 is a flow chart of a first exemplary embodiment of a method for distributing a common time reference within a distributed architecture including an electrical clock pulse signal and a time of day pulse signal.

FIG. 4 is a flow chart of a first exemplary embodiment of a method 400 for distributing a common time reference within a distributed architecture including an electrical clock pulse signal 304 and a time of day pulse signal 308. While reference is made to various elements discussed above in connection with exemplary system 300, it should be understood that an implementation of exemplary method 400 is not limited to exemplary system 300.

The method 400 starts in step 402 and continues to step 404. In step 404 the electrical clock pulse signal 304 is generated. In various exemplary embodiments, the electrical clock pulse signal 304 is generated by the central clock module 302. In step 406, the electrical clock pulse signal 304 is distributed, for example, from the central clock module 302 to modulator 306.

In step 408, the time of day pulse signal 308 is generated. In various exemplary embodiments, the time of day pulse signal 308 is generated by the central clock module 302. In step 410 the time of day pulse signal is distributed, for example, from the central clock module 302 to the modulator 306.

In step 412, the electrical clock pulse signal 304 and the time of day pulse signal 308 are combined. This was also described above as superimposing or summing the electrical clock pulse signal 304 and the time of day pulse signal 308 in connection with the functions performed by the modulator 306. Accordingly, in various exemplary embodiments, the product of step 412 is the modulated reference clock signal 310. In step 414, the modulated reference clock pulse signal 310 is sent, such as, from modulator 306 to subassemblies 312, 314.

In step 416 a frequency is centrally distributed. In various exemplary embodiments, the centrally distributed frequency of step 416 is received by the frequency counter 318. Accordingly, in various exemplary embodiments, the value of the frequency counter 318 is incremented in step 418.

In step 419, the modulated reference clock pulse signal 310 is received, for example, by the threshold detector 316. In step 420, the modulated reference clock pulse signal 310 is demodulated. In step 421, the time of day pulse signal 308 is detected in the modulated reference clock pulse signal 310. The detection of the time of day pulse signal 308 in the modulated reference clock pulse signal 310 then triggers two parallel paths as depicted in exemplary method 400. It should be understood that these two parallel paths operate independently of one another.

In step 422 the central clock module 302 is queried by the subassemblies 312, 314. This is depicted by query 320. Then, in step 424, the central clock module 302 sends the time value corresponding to the last pulse CTpulse(n) to the subassemblies 312, 314, along path 322. In step 426, the subassemblies 312, 314 receive CTpulse(n). Next, in step 428, the subassemblies 312, 314 update the stored central time value with the value of CTpulse(n) received from the central clock module 302 in step 426. Independently, following step 421, in step 430 the value of the frequency counter 318, LCpulse(n), is recorded when the time of day pulse 308 is detected in the modulated reference clock pulse signal 310.

In step 432, the global time value GT(x) is calculated. In various exemplary embodiments, GT(x) is calculated based on the value in the frequency counter 318 such as according to the formula detailed above in connection with exemplary system 300. In step 434, a timestamp is generated based on the global time value GT(x). In step 436, one or more events between subassemblies are correlated.

Except as expressly noted above, it should be understood that the order of the steps depicted in connection with exemplary method 400 occur in different orders in other exemplary embodiments. Likewise, it should also be apparent that certain of the steps presented in connection with exemplary method 400 are omitted in certain other exemplary embodiments. In step 438, the method 400 stops.

Figure 5:
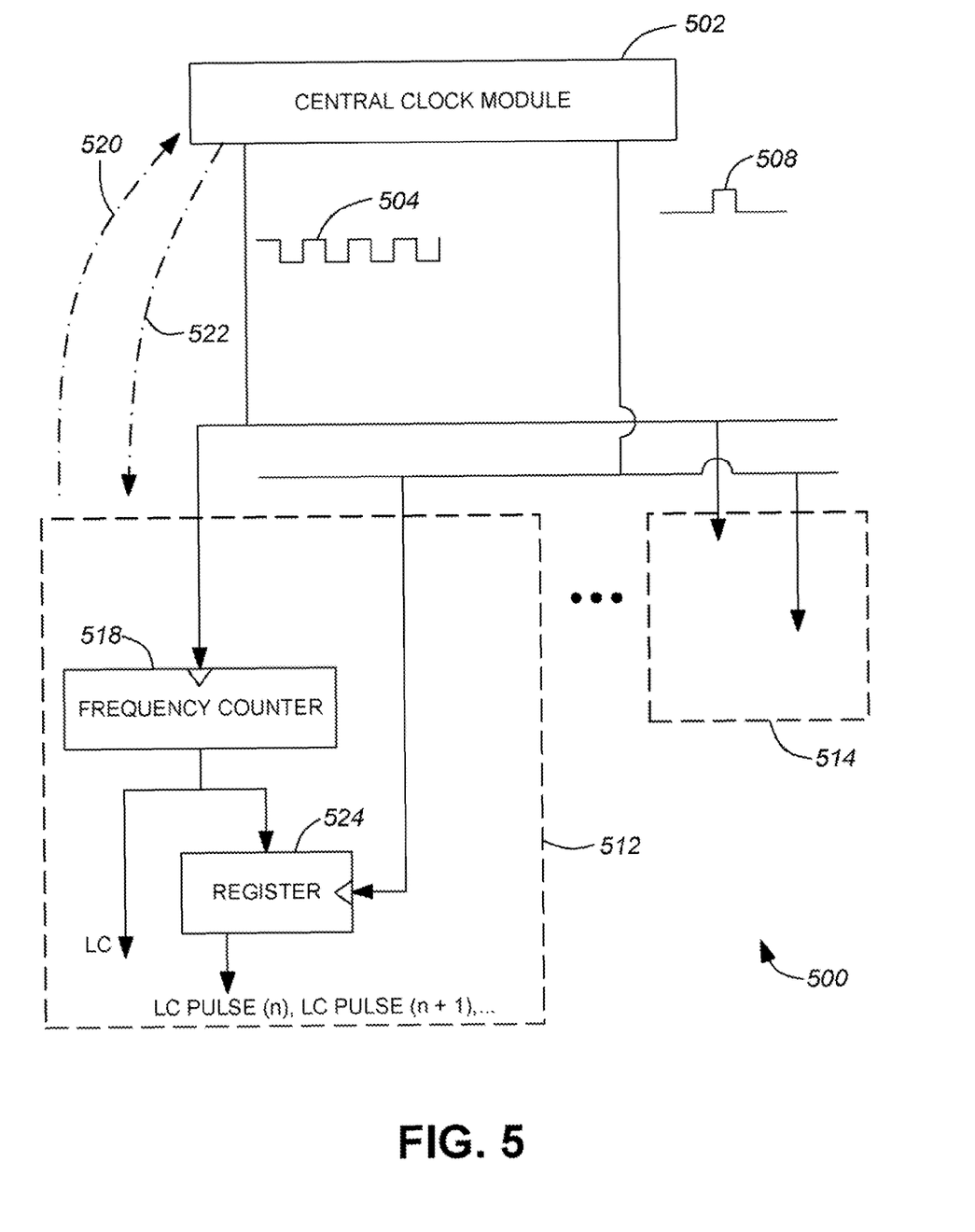
FIG. 5 is a schematic diagram of a second exemplary embodiment of a system for distributing a common time reference within a distributed architecture including an electrical clock pulse signal and a time of day pulse signal.

FIG. 5 is a schematic diagram of a second exemplary embodiment of a system 500 for distributing a common time reference within a distributed architecture including an electrical clock pulse signal 504 and a time of day pulse signal 508. It should be apparent that many elements depicted in connection with system 500 parallel similar elements described above in connection with system 300. The correspondence between elements in system 300 and system 500 is indicated where elements in system 300 and system 500 share the final two characters of their reference number in common. Accordingly, it should be understood that the descriptions provided above in connection with system 300 also apply to system 500, except for the differences discussed below.

Specifically, the central clock module 502 corresponds to the central clock module 302. The electrical clock pulse signal 504 corresponds to the electrical clock pulse signal 304, except that it is provided directly to the subassemblies 512, 514. Likewise, the time of day pulse signal 508 corresponds to the time of day pulse signal 308 except that it is provided directly to the subassemblies 512, 514. Accordingly, exemplary system 500 does not include a modulator, a modulated reference clock pulse signal, or the other treatment discussed above in connection with those elements of exemplary system 300 and exemplary method 400.

Line card 512 and line card 514 correspond to line card 312 and line card 314, respectively, except that they do not include a threshold detector. Rather, the time of day pulse signal 508 is provided directly to the register 524. Similarly, the electrical clock pulse signal 504 is provided directly to the frequency counter 518.

Figure 6:
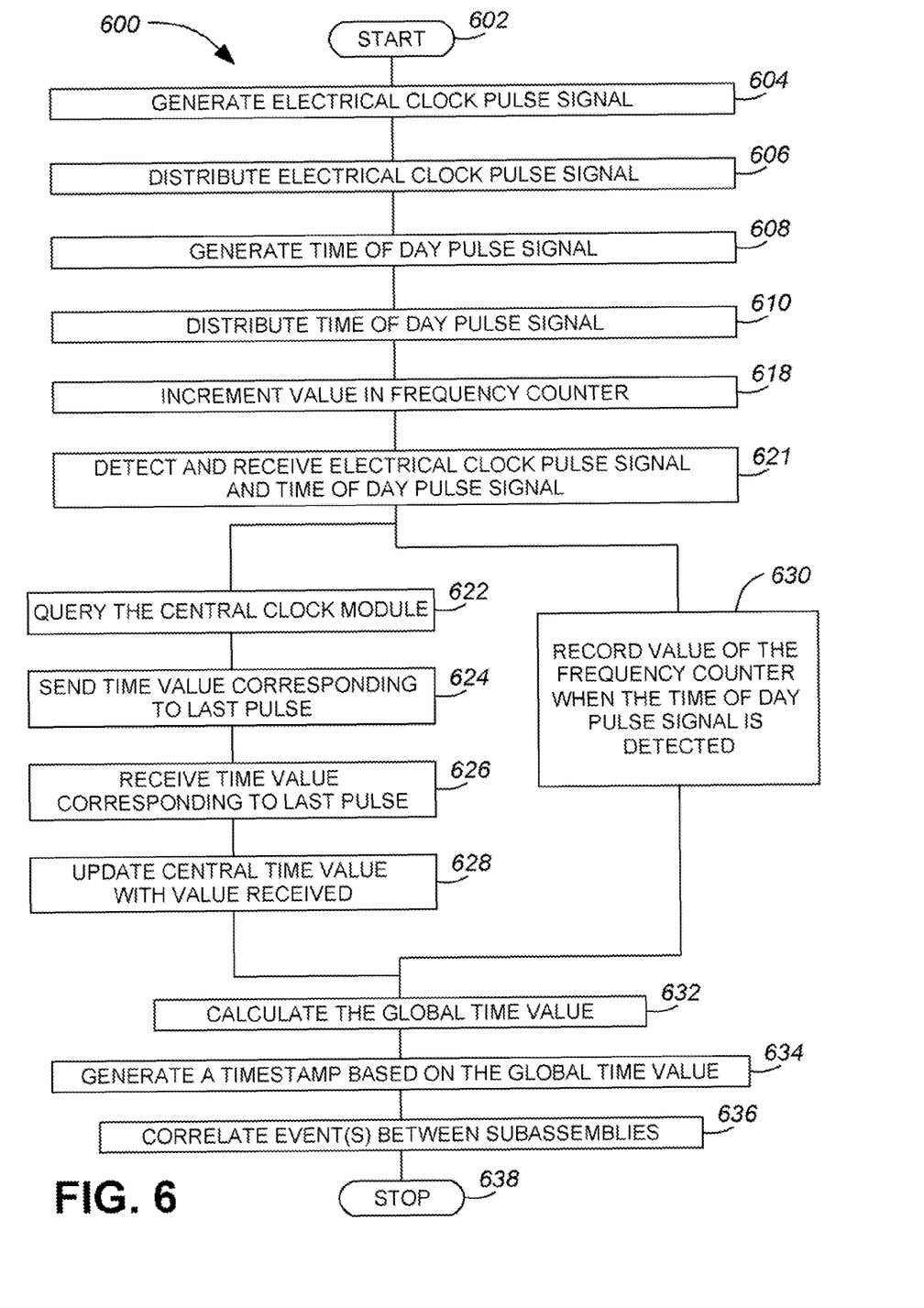
FIG. 6 is a flow chart of a second exemplary embodiment of a method for distributing a common time reference within a distributed architecture including an electrical clock pulse signal and a time of day pulse signal.

FIG. 6 is a flow chart of a second exemplary embodiment of a method 600 for distributing a common time reference within a distributed architecture including an electrical clock pulse signal 504 and a time of day pulse signal 508. While reference is made to various elements discussed above in connection with exemplary system 500, it should be understood that an implementation of exemplary method 600 is not limited to exemplary system 500.

The method 600 starts in step 502 and continues to step 504. In step 604 the electrical clock pulse signal 504 is generated. In various exemplary embodiments, the electrical clock pulse signal 504 is generated by the central clock module 502. In step 606, the electrical clock pulse signal 504 is distributed, for example, from the central clock module 502 to the frequency counter 518.

In step 608, the time of day pulse signal 508 is generated. In various exemplary embodiments, the time of day pulse signal 508 is generated by the central clock module 502. In step 610 the time of day pulse signal is distributed, for example, from the central clock module 502 to the register 524.

The value of the frequency counter 518 is incremented in step 618. In step 621, the electrical clock pulse signal 504 and the time of day pulse signal 508 are received, for example, by the frequency counter 518 and the register 524, respectively. Also in step 621, the presence of the time of day pulse signal 508 is detected, for example, in the register 524. The detection of the time of day pulse signal 508 then triggers two parallel paths as depicted in exemplary method 600. It should be understood that these two parallel paths operate independently of one another.

In step 622 the central clock module 502 is queried by the subassemblies 512, 514. This is depicted by query 520. Then, in step 624, the central clock module 502 sends the time value corresponding to the last pulse CTpulse(n) to the subassemblies 512, 514, along path 522. In step 626, the subassemblies 512, 514 receive CTpulse(n). Next, in step 628, the subassemblies 512, 514 update the stored central time value with the value of CTpulse(n) received from the central clock module 502 in step 626. Independently, following step 621, in step 630 the value of the frequency counter 518, LCpulse(n), is recorded when the time of day pulse 508 is detected.

In step 632, the global time value GT(x) is calculated. In various exemplary embodiments, GT(x) is calculated based on the value in the frequency counter 518 such as according to the formula detailed above in connection with exemplary system 500 (by reference to exemplary system 300). In step 634, a timestamp is generated based on the global time value GT(x). In step 636, one or more events between subassemblies are correlated.

Except as expressly noted above, it should be understood that the order of the steps depicted in connection with exemplary method 600 occur in different orders in other exemplary embodiments. Likewise, it should also be apparent that certain of the steps presented in connection with exemplary method 600 are omitted in certain other exemplary embodiments. In step 638, the method 600 stops.

According to the foregoing, various exemplary embodiments enable a significantly improved accuracy in the time values generated between any of the subassemblies. The more accurate time values can then be used to correlate events between the subassemblies such as packet transit time from ingress port to egress port.

Various exemplary embodiments that distribute a global time base using a backplane pulse signal can be implemented in most telecom devices without the need for hardware upgrade. For example, as described herein, in various exemplary embodiments the pulse event is overlaid on the signal used to distribute a common frequency within a device.

Accordingly, various exemplary embodiments improve the accuracy of IEEE 1588v2 time of day synchronization in large networks. This is achieved, in various exemplary embodiments, by enabling time of day synchronization of ingress and egress ports of a system such as a telecom system. This is believed to be more important when the system acts as a border node according to IEEE 1588v2.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of distributing a common time reference within a distributed architecture, comprising:
    generating at least one electrical pulse at a central entity;
    distributing the generated at least one electrical pulse to a subassembly;
    receiving the distributed at least one electrical pulse at the subassembly;
    recording a reception counter value corresponding to a value of a local frequency counter when the at least one electrical pulse is received at the subassembly;
    querying the central entity to obtain a generation time value corresponding to a time at which the at least one electrical pulse was generated; and
    determining a global time value using the obtained generation time value, the recorded reception counter value, and a current counter value of the local frequency counter.

2. The method of distributing a common time reference within a distributed architecture according to claim 1, wherein the central entity is a central clock module.

3. The method of distributing a common time reference within a distributed architecture according to claim 1, wherein the at least one electrical pulse comprises an electrical clock pulse signal and a time of day pulse signal.

4. The method of distributing a common time reference within a distributed architecture according to claim 3, further comprising:
    distributing the electrical clock pulse signal and the time of day pulse signal to a modulator.

5. The method of distributing a common time reference within a distributed architecture according to claim 4, further comprising:
    superimposing the electrical clock pulse signal and the time of day pulse signal to obtain a modulated reference clock pulse signal;
    sending, from the modulator, the modulated reference clock pulse signal; and
    receiving the modulated reference clock pulse signal at the subassembly.

6. The method of distributing a common time reference within a distributed architecture according to claim 5, further comprising:
    receiving the modulated reference clock pulse signal with a threshold detector in the subassembly.

7. The method of distributing a common time reference within a distributed architecture according to claim 6, further comprising:
    demodulating the modulated reference clock pulse signal; and
    detecting the time of day pulse signal in the modulated reference clock pulse signal.

8. The method of distributing a common time reference within a distributed architecture according to claim 1, further comprising:
    distributing, by the central entity, a frequency; and
    receiving, at the subassembly, the centrally-distributed frequency.

9. The method of distributing a common time reference within a distributed architecture according to claim 8, further comprising:
    receiving the centrally distributed frequency with the local frequency counter in the subassembly.

10. The method of distributing a common time reference within a distributed architecture according to claim 1, wherein the subassembly is a line card in a networking element.

11. The method of distributing a common time reference within a distributed architecture according to claim 1, further comprising:
    dividing the difference between the current counter value and the reception counter value by a central clock frequency to obtain a quotient; and
    adding the generation time value to the quotient to determine the global time value.

12. A system for distributing a common time reference, comprising:
    a central clock module configured to generate and distribute at least one electrical pulse;
    a modulator configured to receive the at least one electrical pulse generated and distributed from the central clock module, create a modulated reference clock pulse signal using the at least one electrical pulse, and transmit the modulated reference clock pulse signal; and
    a plurality of subassemblies, each subassembly comprising a local frequency counter, wherein each subassembly is configured to record a reception counter value corresponding to a value of the local frequency counter when the subassembly receives the modulated reference clock pulse signal, query the central clock module to obtain a generation time value corresponding to a time at which the central clock module generated the at least one electrical pulse, and determine a global time value using the obtained generation time value, the recorded reception counter value, and a current counter value of the local frequency counter.

13. The system for distributing a common time reference according to claim 12, wherein the global time value determined at each subassembly synchronizes the operation of the plurality of subassemblies.

14. The system for distributing a common time reference according to claim 12, wherein the at least one electrical pulse comprises an electrical clock pulse signal and a time of day pulse signal.

15. The system for distributing a common time reference according to claim 12, wherein the local frequency counter is configured to maintain a reference clock rate at a frequency used by the central clock module.

16. The system for distributing a common time reference according to claim 12, wherein each subassembly further comprises:
- a threshold detector configured to determine when the modulated reference clock pulse signal received from the modulator exceeds a predetermined threshold; and
- a register configured to obtain the current counter value from the local frequency counter.

17. A system for distributing a common time reference, comprising:
- a central clock module configured to generate and distribute at least one electrical pulse;
- a plurality of subassemblies, each subassembly comprising a local frequency counter, wherein each subassembly is configured to record a reception counter value corresponding to a value of the local frequency counter when the subassembly receives the at least one electrical pulse from the central clock module, query the central clock module to obtain a generation time value corresponding to a time at which the central clock module generated the at least one electrical pulse, and determine a global time value using the generation time value, the reception counter value, and a current counter value of the local frequency counter.

18. The system for distributing a common time reference according to claim 17, wherein the global time value determined at each subassembly synchronizes the operation of the plurality of subassemblies.

19. The system for distributing a common time reference according to claim 17, wherein the at least one electrical pulse comprises an electrical clock pulse signal and a time of day pulse signal.

20. The system for distributing a common time reference according to claim 17, wherein the local frequency counter is configured to maintain a reference clock rate at a frequency used by the central clock module.

* * * * *